US012723750B2

(12) United States Patent
Ding et al.

(10) Patent No.: US 12,723,750 B2
(45) Date of Patent: Sep. 1, 2026

(54) DRIVING METHOD FOR THE SYNERGISTIC COMBUSTION OF FOSSIL FUELS AND NUCLEAR-CHEMICAL ENERGY

(71) Applicant: LINGHANGGUOCHUANG (BEIJING) TECHNOLOGY GROUP CO., LTD, Beijing (CN)

(72) Inventors: Enzhen Ding, Ferntree Gully (AU); Angang Liu, Beijing (CN)

(73) Assignee: LINGHANGGUOCHUANG (BEIJING) TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 18/264,763

(22) PCT Filed: May 15, 2023

(86) PCT No.: PCT/CN2023/094104
§ 371 (c)(1),
(2) Date: Aug. 9, 2023

(87) PCT Pub. No.: WO2023/226805
PCT Pub. Date: Nov. 30, 2023

(65) Prior Publication Data

US 2025/0075903 A1 Mar. 6, 2025

(30) Foreign Application Priority Data

May 24, 2022 (CN) ........................ 202210569649.X

(51) Int. Cl.
*F23C 99/00* (2006.01)
*H05H 1/48* (2006.01)

(52) U.S. Cl.
CPC .......... *F23C 99/001* (2013.01); *H05H 1/482* (2021.05)

(58) Field of Classification Search
CPC ...... F23C 99/001; H05H 1/482; H05H 1/466; Y02E 30/10
See application file for complete search history.

(56) References Cited

U.S. PATENT DOCUMENTS

| | | | | |
|---|---|---|---|---|
| 2005/0122050 | A1* | 6/2005 | Routberg | G21F 9/305 315/111.41 |
| 2009/0206064 | A1* | 8/2009 | Reichmann | B23K 10/00 219/121.36 |
| 2009/0213975 | A1* | 8/2009 | Sturt | G21B 3/006 376/107 |

FOREIGN PATENT DOCUMENTS

| | | |
|---|---|---|
| CN | 101473385 A | 7/2009 |
| CN | 101563182 Y | 10/2009 |

(Continued)

OTHER PUBLICATIONS

International search report of PCT/CN2023/094104.

*Primary Examiner* — Alfred Basichas
(74) *Attorney, Agent, or Firm* — Hemisphere Law, PLLC

(57) ABSTRACT

The invention discloses a driving method for the synergistic combustion of fossil fuels and nuclear-chemical energy, pertaining to the field of fossil fuel combustion and nuclear energy utilization technology. The method comprises the following steps: introducing fossil fuel and combustion-supporting gas into an alternating electromagnetic field, causing collision of dissociated light nuclei, initiating nuclear fusion reactions, and releasing nuclear energy. Subsequently, the plasma-state fossil fuel and combustion-supporting gas, after leaving the controlled zone of the alternating electromagnetic field, undergo ultra-fast combustion within microseconds, significantly enhancing the ignition speed. Moreover, this method allows for the simultaneous release of chemical energy and nuclear energy during fossil fuel combustion, enabling the peaceful utilization of nuclear
(Continued)

fusion energy and greatly improving the efficiency of energy release during combustion, leading to effective conservation of fossil fuel consumption.

10 Claims, 5 Drawing Sheets

(56) References Cited

FOREIGN PATENT DOCUMENTS

| | | | |
|---|---|---|---|
| CN | 113175398 | A | 7/2021 |
| CN | 114143950 | Y | 3/2022 |
| CN | 115183268 | | 10/2022 |
| JP | 2021038961 | A | 3/2021 |

* cited by examiner

DRIVING METHOD FOR THE SYNERGISTIC COMBUSTION OF FOSSIL FUELS AND NUCLEAR-CHEMICAL ENERGY

TECHNICAL FIELD

The present application relates to the field of fossil fuel combustion and nuclear energy utilization technology, more specifically, it involves a driving method for the synergistic combustion of fossil fuels.

BACKGROUND ART

Under normal circumstances, fossil fuels combust in the presence of air or oxygen, releasing their calorific value. In terms of synergistic combustion of fossil fuels in a sliding arc plasma field under atmospheric pressure, there are existing technologies such as the patent application of publication number CN114143950A for an oxygen flame composite plasma torch, the patent application of publication number CN111947151A for a gas composite plasma torch, and the patent application of publication number CN109600899A for an oxygen flame composite plasma torch, all of which are patent applications from the same inventors' family, but the principles behind them are not disclosed. Therefore, there is currently no reported technology in the prior art that specifically addresses synergistic combustion of fossil fuels and nuclear-chemical energy for the peaceful utilization of nuclear fusion energy to improve the combustion performance of fossil fuels.

INVENTION DESCRIPTION

The purpose of the present application is to provide a driving method for the synergistic combustion of fossil fuels. This method allows for the simultaneous release of chemical energy and nuclear energy during fossil fuel combustion, thereby improving the efficiency of energy release during combustion The technical issue of present application is addressed by implementing the following technical solutions.

The embodiments of the present application provide a driving method for the synergistic combustion of fossil fuels, wherein the fossil fuel and the combustion-supporting gas are introduced into a non-uniform high-gradient distorted alternating electromagnetic field, dissociating light nuclei for collision, and subsequently undergoing combustion after exiting the alternating electromagnetic field.

The working principle of the driving method in the present application is as follows: Fossil fuels contain small amounts of deuterium, tritium and other light nuclear isotopes. In a specific non-uniform high-gradient distorted alternating electromagnetic field ranging from 500V to 100 kV, light nuclei undergo fusion collisions, releasing nuclear energy. In this plasma field, both the fossil fuel and air components dissociate, exposing atomic nuclei, and entering a "deep plasma state" where they cannot combust to form $CO_2$ and $H_2O$ compounds. Instead, they are forced to dissociate into atomic nuclei and electrons, providing the necessary conditions for nuclear reactions to occur. Only when the fossil fuel exits this plasma field can it undergo "combustion synthesis" and fully release the "combustion heat value (chemical energy)" of the fossil fuel. After departing from this plasma field control, it can be ignited within a time frame of $10^{-1}$ to $10^{2}$ microseconds (s), which is approximately 1 to 3 orders of magnitude shorter than the ignition time of natural combustion. Notably, even if only 1% of deuterium in 1 $NM^3$ of natural gas undergoes fusion, it can generate an energy of 39 MJ, surpassing the pure low heat value of 37.5 MJ obtained from the combustion of natural gas. The plasma-driven technology and application of the synergistic combustion of fossil fuels and nuclear-chemical energy can achieve the same thermal energy value while significantly conserving fossil fuels.

Compared with the existing technologies, this application has at least the following advantages or beneficial effects:

The present application provides a driving method for the synergistic combustion of fossil fuels, wherein a specific alternating electromagnetic field is employed to generate a recurring sliding arc. The light nuclei dissociated from fossil fuels and air collide, releasing nuclear energy. When the fossil fuel exits the non-uniform gradient electric field, i.e., the controlled zone of the "alternating electromagnetic field, " it undergoes ultra-fast combustion within a time frame of 101 to $10^{2}$ microseconds, significantly enhancing the ignition speed.

Moreover, this driving method fully allows for the simultaneous release of chemical energy and nuclear energy during fossil fuel combustion, enabling the peaceful utilization of nuclear fusion energy and greatly improving the efficiency of energy release during combustion, leading to effective conservation of fossil fuel consumption.

DESCRIPTION OF THE DRAWINGS

To provide a clearer understanding of the technical solution in the embodiment of the present application, a brief introduction to the drawing used in the embodiment will be provided. It should be understood that these drawings only represent certain embodiments of the present application and should not be considered as limiting the scope thereof. Ordinary skilled persons in the field can also obtain other related drawings based on these drawings without exercising inventive effort.

DETAILED IMPLEMENTATION METHODS

Figure 1:
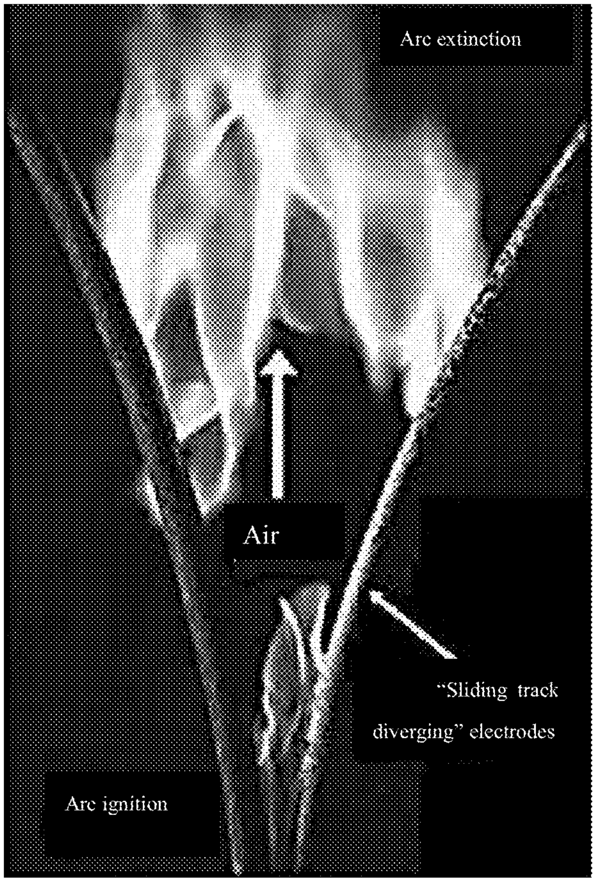
FIG. 1 is a schematic diagram of a driving method for the synergistic combustion of fossil fuels in the embodiments of the present application.

In order to provide a clear description of the objectives, technical solutions, and advantages of the embodiments of the present application, the following will combine the drawing of the embodiments of the present application to describe the technical solutions in a clear and complete manner. Conventional conditions or conditions recommended by manufacturers are used for embodiments where specific conditions are not indicated. Reagents or instruments not specified by the manufacturer are conventional products that can be obtained commercially.

It should be noted that features in the embodiments of the present application can be combined with each other unless there is a conflict. Detailed descriptions of the present application will now be provided with reference to specific embodiments.

A driving method for the synergistic combustion of fossil fuels, whose steps comprises: introducing fossil fuel and combustion-supporting gas into a non-uniform high-gradient distorted alternating electromagnetic field, dissociating light nuclei for collision, and subsequently undergoing combustion after exiting the alternating electromagnetic field.

Fossil fuels contain small amounts of deuterium, tritium and other light nuclear isotopes. In a specific non-uniform high-gradient distorted alternating electromagnetic field ranging from 500V to 25,000V, light nuclei undergo fusion collisions, releasing nuclear energy. In this plasma field, both the fossil fuel and air components dissociate, exposing atomic nuclei, and entering a "deep plasma state" where they cannot combust to form $CO_2$ and $H_2O$ compounds. Instead, they are forced to dissociate into atomic nuclei and electrons, providing the necessary conditions for nuclear reactions to occur. Only when the fossil fuel exits this plasma field can it undergo "combustion synthesis" and fully release the "combustion heat value" of the fossil fuel. After departing from this plasma field control, it can be ignited within a time frame of $10^{-1}$ to $10^{2}$ microseconds (s), which is approximately 1 to 3 orders of magnitude shorter than the ignition time of natural combustion. Notably, even if only 1% of deuterium in 1 $NM^3$ of natural gas undergoes fusion, it can generate an energy of 39 MJ, surpassing the pure low heat value of 37.5 MJ obtained from the combustion of natural gas. The plasma-driven technology and application of the synergistic combustion of fossil fuels and nuclear-chemical energy can achieve the same thermal energy value while significantly conserving fossil fuels.

The alternating electromagnetic field in the present application is characterized by high energy efficiency, large plasma volume, and low gas flow rate, facilitating the release of nuclear energy.

The formula for the kinetic energy gained by a charged particle in an electric field is:

$$E = \frac{1}{2} m v^2 = q_H U$$

Table 1 displays the ionization energies (in eV) for all electrons of the first 9 elements in the periodic table.

TABLE 1

| No. | Symbol | Name | 1st | 2nd | 3rd | 4th | 5th | 6th | 7th | 8th | 9th |
|---|---|---|---|---|---|---|---|---|---|---|---|
| 1 | H | Hydrogen | 13.1 | | | | | | | | |
| 2 | He | Helium | 23.3 | 52.5 | | | | | | | |
| 3 | Li | Lithium | 5.2 | 73.0 | 118.2 | | | | | | |
| 4 | Be | Beryllium | 9.0 | 17.6 | 148.5 | 210.1 | | | | | |
| 5 | B | Boron | 8.0 | 24.3 | 36.6 | 250.3 | 328.3 | | | | |
| 6 | C | Carbon | 10.9 | 23.5 | 46.2 | 62.2 | 378.3 | 472.8 | | | |
| 7 | N | Nitrogen | 14.0 | 28.6 | 45.8 | 74.8 | 94.4 | 532.7 | 643.6 | | |
| 8 | O | Oxygen | 13.1 | 33.9 | 53.0 | 74.7 | 109.9 | 133.3 | 713.3 | 840.8 | |
| 9 | F | Fluorine | 16.8 | 33.7 | 60.5 | 84.1 | 110.2 | 151.6 | 178.7 | 920.4 | 1064.3 |

By referring to the ionization energy data of the elements listed in table 1, it can be observed that the ionization energies of all the electrons of the first 9 elements in the periodic table are significantly lower than 6.487 keV (the kinetic energy obtained by deuterium nucleus in a 6,500 V electric field). This implies that in the range of 500V to 100 kV of the alternating non-uniform gradient electric field, these 9 elements are essentially fully ionized, exposing their atomic nuclei completely. In particular, isotopes such as deuterium and tritium, due to the multi-phase non-uniform gradient alternating electromagnetic field, provide the necessary conditions for high-speed collisions of atomic nuclei, thus enabling fusion reactions.

In some embodiments of the present application, the fossil fuel refers to a fluid comprising one or several mixtures of gaseous, liquid, and solid states.

In some embodiments of the present application, the combustion-supporting gas is air. As an alternative, the combustion-supporting gas may also be oxygen.

In some embodiments of the present application, the alternating electromagnetic field is formed by formed by the collaboration of a plasma power supply and electrodes. Specifically, the alternating electromagnetic field device used in the embodiments of the present application employs an oxygen flame composite plasma torch, as disclosed in the patent publication of CN114143950A. Therefore, the specific structure and source of the device are not further described in the present application.

In some embodiments of the present application, the plasma power supply is a single-phase plasma power supply or a multi-phase plasma power supply, thereby forming a single-phase electric field or a multiphase electric field.

A non-uniform gradient electric field is formed by multiple electrodes, thereby creating a recurring sliding arc field. The arc ignition starts from the closest point to the electrode, where the arc voltage is the lowest. With the injection of gas flow, the arc slides upward along the "track-type" electrode surface, gradually elongating the arc and increasing the arc voltage. When the arc reaches its maximum length, the arc voltage reaches the no-load voltage, and the arc extinguishes, followed by the generation of a new arc at the closest point of the electrode, repeating the cycle. Under the influence of high-frequency AC voltage, a new arc is often generated at the closest point of the electrode before the longest arc extinguishes, thereby forming a gradient electric field.

It should be noted that at the moment when the far end of sliding arc disappears, the output voltage of the plasma power source reaches its maximum, which is the no-load value of the power source. As the sliding arc is generated and propelled by low gas flow velocity along the "electrode surface track," until the arc disappears, this "large volume three-dimensional plasma field" exhibits a non-uniform high-gradient electric potential field. Within this region, the fossil fuel and air (or oxygen) undergo ionization, exposing the atomic nuclei.

In some embodiments of the present application, the electrodes are made of alloys or metallic materials with high thermal conductivity and a melting point greater than 1000° C., such as copper and stainless steel. Metals with high melting points that are resistant to oxidation offer advantages of easy cooling and long lifespan.

In some embodiments of the present application, the electrode shape is one or more of the following: blade-shaped, curved tube expanding-diverging, spiral ascending, spherical, and ellipsoidal. The electrode structures in these shapes facilitate the generation of non-uniform and even distorted high-gradient alternating electromagnetic fields, which are conducive to the collision and fusion of charged atomic nuclei.

In some embodiments of the present application, the electrodes are hollow air-cooled electrodes or water-cooled electrodes.

In some embodiments of the present application, the alternating voltage of the alternating electromagnetic field ranges from 500V to 100 kV. The voltage level has an impact on the magnitude of the kinetic energy acquired by the charged atomic nuclei under the influence of the electric field. The magnitude of the kinetic energy is a critical factor in determining the success of atomic nucleus collisions in overcoming the potential barrier.

In some embodiments of the present application, the frequency of the alternating electromagnetic field ranges from 10 Hz to 20,000 Hz. The magnitude of the electrical frequency determines the reversal rate of oscillatory motion of energized atomic nuclei in the electromagnetic field. Combined with the non-uniform distorted alternating electric field, it further influences the"probability" of atomic nucleus collisions.

In some embodiments of the present application, the fossil fuel and combustion-supporting gas exhibit a residence time exceeding 1 microsecond within the non-uniform high-gradient distorted alternating electromagnetic field.

Figure 5:
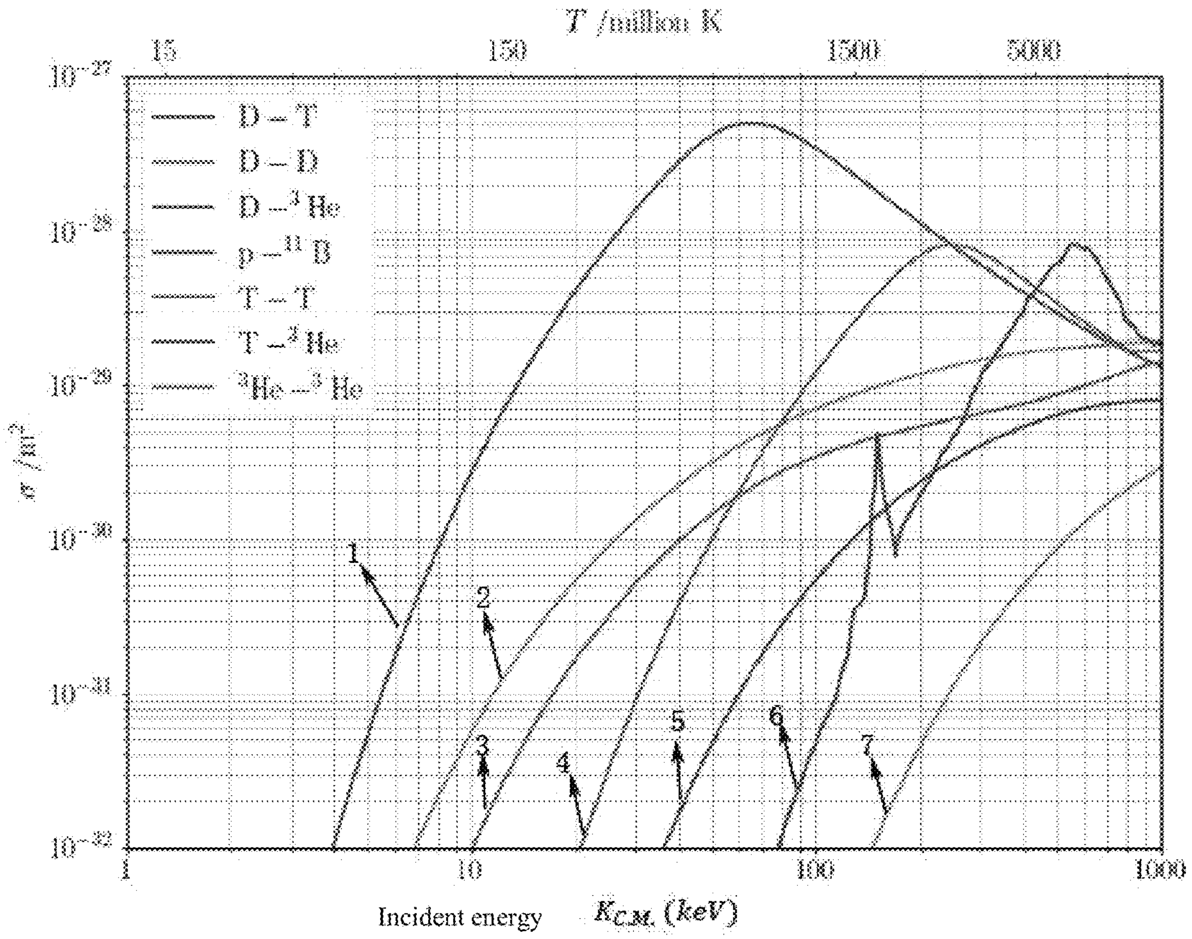
FIG. 5 is a schematic diagram of experimental curves showing the relationship between multiple representative cross-sections of light nucleus fusion reactions and incident energy in the embodiments of the present application.

The determination of voltage and frequency for the alternating electromagnetic field is illustrated by FIG. 5, which represents a set of publicly available experimental curves of typical fusion energy (temperature)-fusion probabilities (fusion cross-section) for seven representative light nuclear reactions recognized by the International Atomic Energy Agency (IAEA) and. In FIG. 5, line 1 represents D-T, line 2 represents D-D, line 3 represents T-T, line 4 represents D-$^3$He, line 5 represents T-$^3$He, line 6 represents p-$^{11}$B, and line 7 represents $^3$He-$^3$He. Fusion occurs when the energy (temperature) of the incident and target nuclei reaches the values indicated on the curves. Due to the small-scale nature of nuclear fusion reactions, the success of collisions can only be determined probabilistically, and the fusion probability is commonly described by the magnitude of the fusion cross-section.

$$E = 1/2mv^2 = q_H U$$

The equation above serves as the calculation basis for determining the kinetic energy of a charged particle in a uniform electric field. In the equation, E represents the kinetic energy, m denotes the mass of the charged particle, v represents the velocity of the charged particle, $q_H$ represents the charge of the particle, and U represents the voltage. In FIG. 5, the energy corresponding to the abscissa of the curves varies depending on the atomic nucleus, as the charge values differ, and consequently, the corresponding voltages also vary. For instance, a deuterium nucleus (with a single positive charge) obtains 6.487 keV at 6,500V. By referring to FIG. 5, it can be observed that nuclear reactions occur at such energy levels. It should be noted that the coordinates in FIG. 5 are presented on a logarithmic scale. Thus, higher voltages correspond to greater kinetic energy of the atomic nucleus. However, excessively high energies can lead to the phenomenon of "knocking away," which is why extremely high energies are not desirable. As a result, the "peak" phenomenon is observed in the curves of FIG. 5.

Frequency refers to the number of repetitions within one second. In the context of electricity, the alternating frequency determines the frequency of the electric field's positive direction. This, in turn, determines the frequency of the force acting on positively charged atomic nuclei. The magnitude of this positive direction frequency determines the frequency at which atomic nuclei oscillate "back and forth". During this oscillation, the nuclei undergo bremsstrahlung, releasing gamma rays. Additionally, the directional conversion of acceleration and deceleration at near-light speed levels occurs in different nuclei. In a non-uniform high-gradient distorted alternating electromagnetic field, atomic nuclei collide and, when they collide, trigger fusion reactions. For example, in a deuterium-deuterium reaction, the product is a helium nucleus. Since the mass of the helium nucleus is smaller than that of two deuterium nuclei, according to Einstein's mass-energy equation $E=mc^2$, energy is released, known as nuclear energy. Therefore, the higher the electrical frequency, the higher the probability of nuclear fusion. However, excessively high frequencies result in limited range and reduced collision probability, leading to a decrease in nuclear fusion.

Further detailed descriptions of the features and performance of the present application will be provided below, in conjunction with specific embodiments.

Embodiment 1

Figure 4:
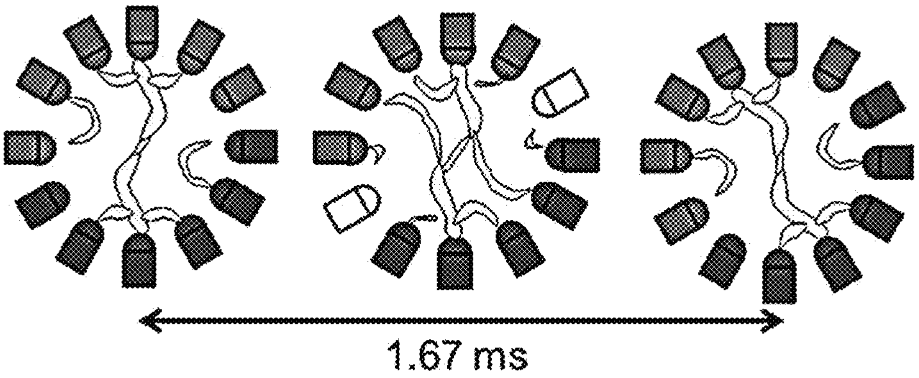
FIG. 4 is a schematic diagram of the discharge mode with twelve-phase AC discharge electrodes arranged in the same plane in the embodiments of the present application.

A driving method for the synergistic combustion of fossil fuels, the working principle of which is illustrated in FIG. 1, comprises the following steps:

In the present embodiment, a twelve-phase sliding arc gas plasma composite burner is used as illustrated in FIG. 4, which means the alternating electromagnetic field in the present embodiment is generated by the collaboration of a twelve-phase plasma power source and electrode. The electrodes in the present embodiment are made of copper and have a blade-shaped design. The twelve surrounding electrodes form the alternating electromagnetic field. The alternating electromagnetic field is activated with an alternating voltage of 50 kV and a frequency of 200 Hz. The bottom of the alternating electromagnetic field is connected to a fuel nozzle. Fossil fuel is injected into the alternating electromagnetic field through the fuel nozzle. Under the influence of the electromagnetic field, the fossil fuel undergoes dissociation and exposes its atomic nuclei by reacting with the air components. Fusion reactions occur when light nuclei collide, generating a sliding arc along the direction of the electrodes. At the moment when the far end of sliding arc disappears, the output voltage of the plasma power source reaches its maximum, which is the no-load value of the power source. As the sliding arc is generated and propelled by the low gas flow velocity, it slides along the "surface track of the electrode" until the arc disappears. This "large volume three-dimensional plasma field" has a non-uniform gradient potential field. After leaving the alternating electromagnetic field, the fossil fuel is ignited.

Embodiment 2

Figure 2:
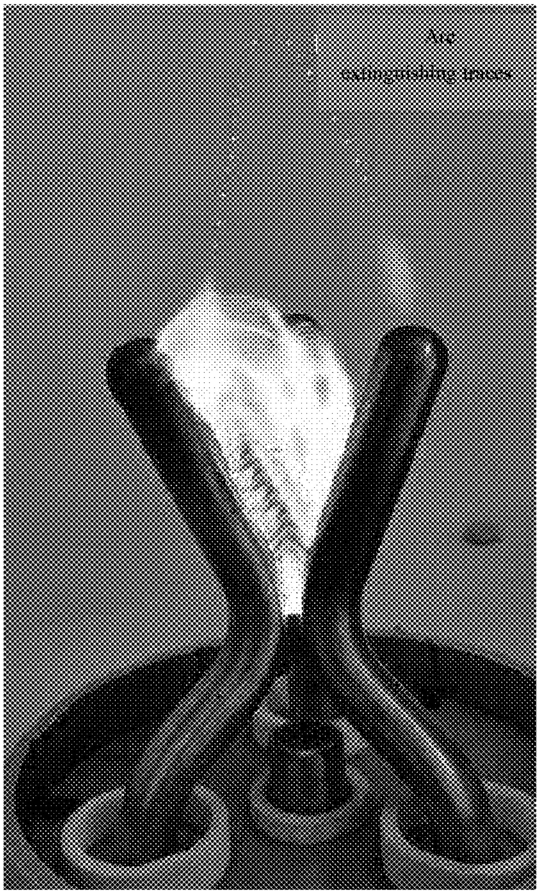
FIG. 2 is a schematic diagram of combustion applying a three-phase sliding arc plasma field in the embodiments of the present application.

A driving method for the synergistic combustion of fossil fuels comprises the following steps:

In the present embodiment, a three-phase sliding arc gas plasma composite burner is used as illustrated in FIG. 2, which means the alternating electromagnetic field in the present embodiment is generated by the collaboration of a three-phase plasma power source and electrode. The electrodes in the present embodiment are made of copper and have a curved tube expanding-diverging design. The three surrounding electrodes form the alternating electromagnetic field. The alternating electromagnetic field is activated with an alternating voltage of 1,000V and a frequency of 2,000 Hz. The bottom of the alternating electromagnetic field is connected to a fuel nozzle. Fossil fuel is injected into the alternating electromagnetic field through the fuel nozzle. Under the influence of the electromagnetic field, the fossil fuel undergoes dissociation and exposes its atomic nuclei by reacting with the air components. Fusion reactions occur when light nuclei collide, generating a sliding arc along the direction of the electrodes. At the moment when the far end of sliding arc disappears, the output voltage of the plasma power source reaches its maximum, which is the no-load value of the power source. As the sliding arc is generated and propelled by the low gas flow velocity, it slides along the "surface track of the electrode" until the arc disappears. This "large volume three-dimensional plasma field" has a non-uniform gradient potential field. After leaving the alternating electromagnetic field, the fossil fuel is ignited.

Embodiment 3

Figure 3:
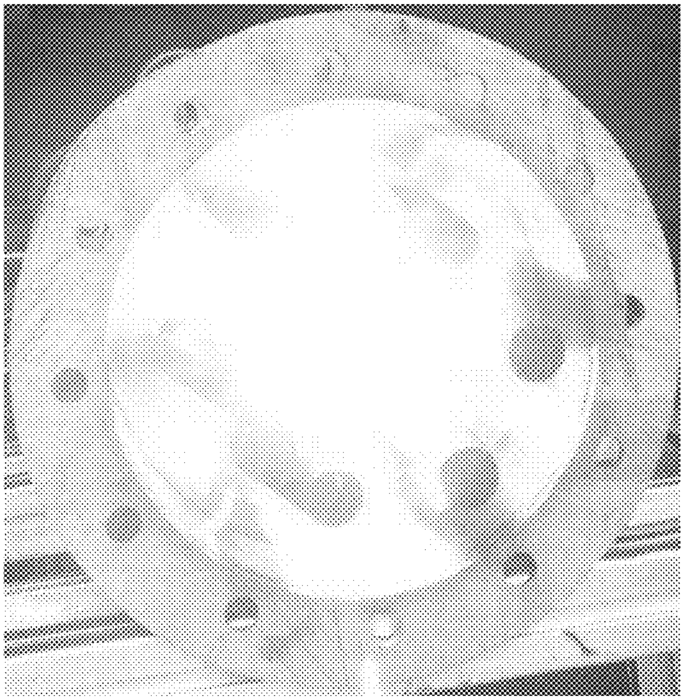
FIG. 3 is a schematic diagram of combustion applying a six-phase sliding arc plasma field in the embodiments of the present application.

A driving method for the synergistic combustion of fossil fuels comprises the following steps:

In the present embodiment, a six-phase sliding arc gas plasma composite burner is used as illustrated in FIG. 3, which means the alternating electromagnetic field in the present embodiment is generated by the collaboration of a six-phase plasma power source and electrode. The electrodes in the present embodiment are made of stainless steel and have a spiral ascending design. The three surrounding electrodes form the alternating electromagnetic field. The alternating electromagnetic field is activated with an alternating voltage of 5,000V and a frequency of 10,000 Hz. The bottom of the alternating electromagnetic field is connected to a fuel nozzle. Fossil fuel is injected into the alternating electromagnetic field through the fuel nozzle. Under the influence of the electromagnetic field, the fossil fuel undergoes dissociation and exposes its atomic nuclei by reacting with the air components. Fusion reactions occur when light nuclei collide, generating a sliding arc along the direction of the electrodes. At the moment when the far end of sliding arc disappears, the output voltage of the plasma power source reaches its maximum, which is the no-load value of the power source. As the sliding arc is generated and propelled by the low gas flow velocity, it slides along the "surface track of the electrode" until the arc disappears. This "large volume three-dimensional plasma field" has a non-uniform gradient potential field. After leaving the alternating electromagnetic field, the fossil fuel is ignited.

Assuming that the composition of $CH_4$ in natural gas is 100%, then in 1 $NM^3$ of natural gas, there are 44.64 mol of $CH_4$. Under the influence of plasma arc, complete dissociation of $CH_4$ occurs, and the formation of plasma takes place.

$$CH_4 \rightarrow C+4H$$

$$44.64\ \text{mol} \rightarrow 44.64 \times 4\ \text{mol}$$

That means, in 1 $NM^3$ of natural gas, there are 44.64×4×6.02×10^23 =$1.07\times10^{26}$ hydrogen atoms.

Calculated based on the abundance of D in natural hydrogen, $U_{(D)}=141.8\times10^{-6}$ (approximately 1 in 7000), In 1 $NM^3$ of natural gas, there are approximately 1.07×1026×141.8×10–6=$1.52\times10^{22}$ D atoms.

Clearly, if 1% of the D atoms in 1 $NM^3$ of natural gas undergo nuclear fusion, it would release thermal energy of 39.64 MJ $$2D \rightarrow 5.216\times10^{-13} J$$

$$1.52\times10^{22}\times1\%\times(5.216\times10^{-13})/2=39.64MJ$$

Note: the lower heating value LHV of 1 $NM^3$ of natural gas is 36-40 MJ.

δ of Isotope: the per mil (‰) deviation of the isotope ratio in a sample relative to the isotope ratio of a standard material;

$$\delta(‰)=\left(\frac{R_{sa}}{R_{st}}-1\right)\times1000=(\alpha-1)\times1000$$

In the equation: $R_{sa}$ represents the isotopic value in the sample; $R_{st}$ standard represents the isotopic ratio in the standard material.

Hydrogen isotope deuterated methane δD $CH_4$>−190‰ in natural gas is defined as marine sedimentary deposits, while the opposite is defined as terrestrial sedimentary deposits. Deuterium is abundant in marine natural gas and methane. If carbon isotope of ethane in natural gas $$\delta_6^{13}C_2\geq-27\%,$$

it is defined as coal-type gas, or if $$\delta_6^{13}C<-28\%,$$

it is defined oil-type gas, with intermediate values defined as mixed sources.

$$\delta_6^{13}C$$

of the carbon isotope of light (condensate) oil ranges from −32.5‰ to −24.3‰, which is relatively higher compared to normal crude oil $$(\delta_6^{13}C-34.4\sim-24.6\%).$$

The hydrogen isotope of light (condensate) oil associated with marine environments δD>−150‰, whereas δD of the hydrogen isotope of light (condensate) oil not associated with marine environments ranges from −210‰ to −105‰.

δD value of hydrogen isotope of coal ranges from −81‰ to −161‰, while the $\delta_6^{13}C$ value of coal falls within the range of −25.37‰ to −23.44‰ (Huainan Zhangji coal mine).

That means fossil fuels naturally contain isotopes of deuterium (a hydrogen isotope) and carbon, which form the basis of nuclear fusion.

Based on aforementioned, Fossil fuels contain small amounts of deuterium, tritium and other light nuclear isotopes. In a specific electromagnetic field ranging from 500V to 25,000V, light nuclei undergo fusion collisions, releasing nuclear energy. In this plasma field, both the fossil fuel and air components dissociate, exposing atomic nuclei, and entering a "deep plasma state" where they cannot combust to form $CO_2$ and $H_2O$ compounds. Instead, they are forced to dissociate into atomic nuclei and electrons, providing the necessary conditions for nuclear reactions to occur. Only when the fossil fuel exits this plasma field can it undergo "combustion synthesis" and fully release the "combustion heat value" of the fossil fuel. After departing from this plasma field control, it can be ignited within a time frame of $10^{-1}$ to $10^{2}$ microseconds (μs), which is approximately 1 to 3 orders of magnitude shorter than the ignition time of natural combustion. Notably, even if only 1% of deuterium in 1 $NM^3$ of natural gas undergoes fusion, it can generate an energy of 39 MJ, surpassing the pure low heat value of 37.5 MJ obtained from the combustion of natural gas. The plasma-driven technology and application of the synergistic combustion of fossil fuels and nuclear-chemical energy can achieve the same thermal energy value while significantly conserving fossil fuels.

The aforementioned embodiments are only a part of the embodiments of the present application, not all of them. The detailed description of the embodiments of the present application is not intended to limit the scope of the claimed invention, but only represents selected embodiments of the present application. Based on the embodiments disclosed in this application, all other embodiments that ordinary skilled persons can obtain without exercising inventive effort are within the scope of protection of the present application.

What is claimed is:

1. A driving method for the synergistic combustion of fossil fuels is characterized by introducing fossil fuel and combustion-supporting gas into a non-uniform high-gradient distorted alternating electromagnetic field, dissociating light nuclei for collision, and subsequently undergoing combustion after exiting the alternating electromagnetic field.

2. The driving method for the synergistic combustion of fossil fuels according to claim 1, wherein the fossil fuel comprises a fluid mixture of one or several of gaseous, liquid, and solid states.

3. The driving method for the synergistic combustion of fossil fuels according to claim 1, wherein the combustion-supporting gas is air.

4. The driving method for the synergistic combustion of fossil fuels according to claim 1, wherein the alternating electromagnetic field has an alternating voltage ranging from 500V to 100 kV.

5. The driving method for the synergistic combustion of fossil fuels according to claim 1, wherein the alternating electromagnetic field has a frequency ranging from 10 Hz to 20,000 Hz.

6. The driving method for the synergistic combustion of fossil fuels according to claim 1, wherein the alternating electromagnetic field is formed by the collaboration of a plasma power supply and electrodes.

7. The driving method for the synergistic combustion of fossil fuels according to claim 6, wherein the plasma power supply is a single-phase plasma power supply or a multiphase plasma power supply, thereby forming a single-phase electric field or a multiphase electric field.

8. The driving method for the synergistic combustion of fossil fuels according to claim 6, wherein the electrodes are made of alloys or metallic materials with high thermal conductivity and a melting point greater than 1000° C.

9. The driving method for the synergistic combustion of fossil fuels according to claim 6, wherein the electrode shape is one or more of the following: blade-shaped, curved tube expanding-diverging, spiral ascending, spherical, and ellipsoidal.

10. The driving method for the synergistic combustion of fossil fuels according to claim 6, wherein the continuous residence time of the fossil fuel and the combustion-supporting gas in the non-uniform high-gradient distorted alternating electromagnetic field is greater than 1 microsecond.

* * * * *